March 16, 1926.
L. C. REED
1,577,193
FASTENING DEVICE FOR INSULATORS
Filed May 1, 1924
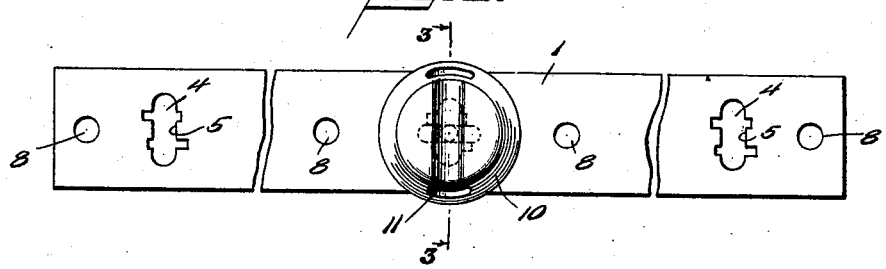
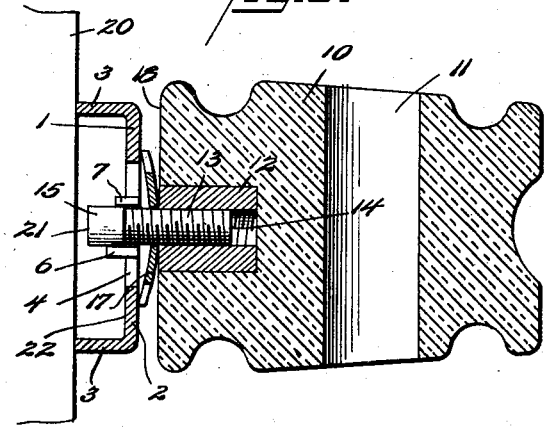
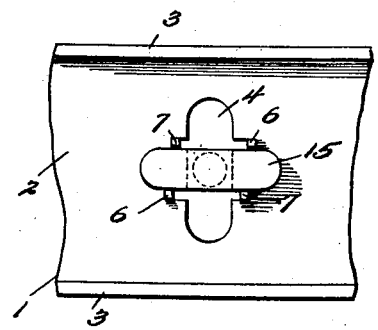
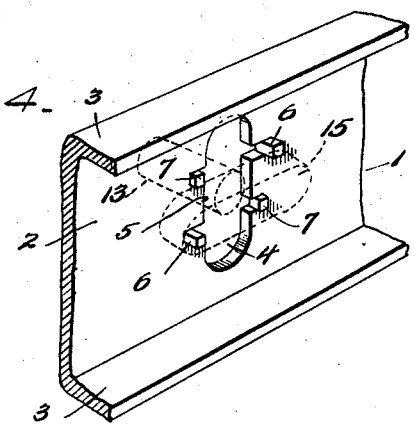
Inventor
L. C. Reed
By F. A. Witherspoon
Attorney

Patented Mar. 16, 1926.

1,577,193

UNITED STATES PATENT OFFICE.

LYMAN C. REED, OF NEW ORLEANS, LOUISIANA, ASSIGNOR TO JOSLYN MANUFACTURING & SUPPLY COMPANY, OF CHICAGO, ILLINOIS, A CORPORATION OF ILLINOIS.

FASTENING DEVICE FOR INSULATORS.

Application filed May 1, 1924. Serial No. 710,401.

*To all whom it may concern:*

Be it known that I, LYMAN C. REED, a citizen of the United States, residing at New Orleans, in the parish of Orleans and State of Louisiana, have invented certain new and useful Improvements in Fastening Devices for Insulators; and I do hereby declare the following to be a full, clear, and exact description of the invention, such as will enable others skilled in the art to which it appertains to make and use the same.

This invention relates to fasteners capable of general use, but especially adapted for securing insulator members to racks and other places, and has for its object to improve the devices of this character which have been heretofore proposed.

With these and other objects in view, the invention consists in the novel details of construction and combinations of parts more fully hereinafter disclosed and particularly pointed out in the claims.

Referring to the accompanying drawings, forming a part of this specification, in which like numerals designate like parts in all the views:—

Figure 1 is a top plan view of an insulator rack with my invention applied thereto;

Figure 2 is a bottom plan view of a portion of the parts shown in Figure 1;

Figure 3 is a sectional view taken on the lines 3—3 of Figure 1, looking in the direction of the arrows;

Figure 4 is a perspective view of the parts shown in Figure 2.

1 indicates any suitable supporting base or rack, preferably comprising a metal plate 2 having the turned-up flanges 3, as shown. Said plate portion 2 is provided with a plurality of oblong-shaped apertures or holes 4 having the side edges 5, and from said edges are preferably struck one or more projections 6, as best shown in Figure 4. From said edges 5 are also struck up projections 7 of less height and dimensions than the projections 6. The said plate 2 is further provided with holes or perforations 8 through which suitable fastening means, not shown, may be passed to secure the rack 1 in place. 10 represents any suitable or desired form of insulator provided with means such as the aperture 11, for supporting a wire, and 12 represents a screw-threaded tube or bushing which is suitably secured in said insulator 10, as by cementing the same. Fitting in said screw-threaded bushing 12 is the screw-threaded shank or extension 13 of a bolt or securing member 14, provided with the key or fastening means 15. Said key or securing means 15 is oblong in shape, as best shown in Figures 2 and 3, and is adapted to readily enter and be withdrawn from the oblong shaped opening 4 with which the rack 1 is provided. A spring washer or other locking means 17 through which said shank 13 passes, is disposed between the lower flat surface 18 of the insulator 10 and the top flat surface of the plate member 2, as best illustrated in Figure 3.

The operation of my improved fastener is as follows: The rack member 1 is secured to any suitable support 20 by means of fastening members, not shown, passing through the holes 8, and when it is desired to secure an insulator 10 to said rack member 1, the shank 13 of the bolt 14 is screwed into the bushing 12 for a portion of its length, whereupon the key member 15 is passed down through one of the oblong holes 4. The depth of the flanges 3 is of such dimensions that the extreme surface 21 of the key member 15 will strike the outer surface of the support 20 and thus will stop the movement of said key member 15. Also, the thickness of the key member 15 is of a dimension greater than the distance between the outer surface of the support 20 and the extreme end portion of the projections or lugs 6. On the other hand, the thickness of the key member 15 is less than the distance between the said outer surface and the extreme end of the lug 7 for a purpose that will presently appear. The insulator member 10 may now be rotated, which will screw up on the screw-threaded extension 13, thus drawing the key member 15 toward the plate member 2, while at the same time rotating said key member 15 to a greater or less extent. During this rotation, as will be readily seen from Figures 3 and 4, the key member 15, due to the dimensions above mentioned may pass over the extreme end portion of the lugs 7, which are shorter than the lugs 6, and thus approach the lugs or projections 6, until it contacts therewith. When this happens, the key member will be held stationary, and the continued rotation of the insulator 10 will still further screw up on the extension 13 until the washer or spring locking member 17 contacts with the top surface of the plate portion 2. This action will continue until the key member 15 is brought into contact with the inner surface 22 of the plate member 2, and in a position at right angles to the axis of the aperture 4, as best illustrated in Figure 4. It may sometime happen that when an insulator 10 is being applied to the rack 1, the key member 15 in its above mentioned rotation will contact with the extreme end portion of the lug 7 before completely passing the same, and hence stop the said rotation. In such a case the continued turning of the insulator will cause the washer to contact with the outer surface of the plate portion. As the insulator 10 continues to turn, the pressure of the washer or locking member 17 increases, until finally the key member 15 will snap over the shorter lug 7 and snap into place between each pair of lugs 6 and 7, as illustrated in Figure 4, whereupon a continued turning of the insulator 10 will lock the parts firmly in place, due to the compression of the locking spring 17. The whole operation only requires a very short time and so firmly anchors the insulator 10 to the holding rack 1 that it needs no further attention. The wires to be supported can then be hung upon the insulators 10 as in any other ordinary fastening means. When it is desired to remove the insulators from the racks 1, it is only necessary to reverse the rotation of said insulators 10, whereupon the screw-threaded shank 13 will be disengaged from the bushing 12, and the said key members and shank can be removed through the apertures 4.

In Figure 1, provision is made for three insulators, but it is evident that a greater or less number can be readily supplied. The rack members 1 are conveniently struck up by suitable dies and the lugs 6 and 7 are conveniently formed during the same operation, although, of course, said lugs may be of different forms and may be otherwise provided.

It is further evident that the utility of this fastening means is by no means limited to insulators. Nor is it limited to a rack member of a shape and design illustrated. In fact, any aperture in a supporting surface that is adapted to interlock with a key member such as 15, could be employed, and any suitable stop members could be substituted for the lugs 6 and 7, and any suitable number of stop members may likewise be employed.

What is claimed is:—

1. In a rack for insulators the combination of a support provided with a surface; a base member having an aperture and secured to said surface; a pair of lugs of different lengths associated with said aperture and projecting from said base member toward said surface; a key member adapted to pass through said aperture having a thickness less than the distance between the extreme end of the shorter of said lugs and said surface and greater than the distance between the extreme end of the longer one of said pair of lugs and said surface; and an insulator adjustably connected with said key member.

2. In a rack for insulators the combination of a support provided with a surface; a base member having an aperture and secured to said surface; a pair of lugs of different lengths associated with said aperture and projecting from said base member toward said surface; a key member adapted to pass through said aperture having a thickness less than the distances between the extreme end of the shorter of said lugs and said surface and greater than the distance between the extreme end of the longer one of said pair of lugs and said surface; an insulator adjustably connected with said key member; and means to retain said insulator and key member in locked relation to said base.

3. In a fastening device the combination of a base member having an aperture and provided with angularly disposed flanges whose free ends are adapted to contact with the surface of a wall; a pair of lugs of different lengths associated with said aperture and projecting from said base member toward the plane of the ends of said flanges; a key member adapted to pass through said aperture having a thickness less than the distance between the extreme end of the shorter of said lugs and said plane and greater than the distance between the extreme end of the longer one of said pair of lugs and said plane; and means for maintaining said key member in locked relation to said base.

4. In a fastening device the combination of a base member having an aperture and provided with a plurality of flanges whose free ends are adapted to contact with the surface of a wall; a pair of lugs of different lengths associated with said aperture and projecting from said base member toward the plane passing through the free ends of said flanges and coinciding with said surface; a key member adapted to pass through said aperture having a thickness less than the distance between the extreme end of the shorter of said lugs and said plane and greater than the distance between the extreme end of the longer one of said pair of lugs and said plane; and threaded means to retain said key member in locked relation to said base.

In testimony whereof I affix my signature.

LYMAN C. REED.